United States Patent
Wyngarden

(10) Patent No.: US 7,779,125 B2
(45) Date of Patent: *Aug. 17, 2010

(54) METHOD AND SYSTEM FOR RECEIVING AND PROVIDING ACCESS TO INFORMATION AT A WEB SITE

(75) Inventor: Amy Van Wyngarden, Austin, TX (US)

(73) Assignee: Dell USA L.P., Round Rock, TX (US)

( * ) Notice: Subject to any disclaimer, the term of this patent is extended or adjusted under 35 U.S.C. 154(b) by 54 days.

This patent is subject to a terminal disclaimer.

(21) Appl. No.: 12/110,769

(22) Filed: Apr. 28, 2008

(65) Prior Publication Data

US 2008/0209530 A1    Aug. 28, 2008

Related U.S. Application Data

(63) Continuation of application No. 11/086,935, filed on Mar. 22, 2005, now Pat. No. 7,389,331, and a continuation of application No. 10/649,579, filed on Aug. 26, 2003, now Pat. No. 6,883,022, and a continuation of application No. 09/488,936, filed on Jan. 21, 2000, now Pat. No. 6,694,365, and a continuation of application No. 09/009,401, filed on Jan. 20, 1998, now Pat. No. 6,038,597.

(51) Int. Cl.
 *G06F 13/00* (2006.01)
(52) U.S. Cl. .................. 709/225; 709/219; 709/250
(58) Field of Classification Search ............... 709/217, 709/219, 223, 224, 225, 227, 229, 250
See application file for complete search history.

(56) References Cited

U.S. PATENT DOCUMENTS 4,751,669 A    6/1988    Sturgis et al.

(Continued)

FOREIGN PATENT DOCUMENTS

EP    0 778 512    6/1997

(Continued)

OTHER PUBLICATIONS

Baentsch, Michael; Baum, Lothar; Molter, Georg; Rothkugel, Steffen; Sturm, Peter, "Enhancing the Web's Infrastructure-From Catching to Replication", pp. 1-8, Systemsoftware Research Group, CS Department, University of Kaiserslautern, Kaiserslautern, Germany.

(Continued)

*Primary Examiner*—Viet Vu
(74) *Attorney, Agent, or Firm*—Haynes and Boone, LLP

(57) ABSTRACT

At a vendor-managed web site, purchasing information is received from a first terminal, including purchasing information that is customized for a customer. The customer includes first and second users having respective first and second levels of authorized access to the purchasing information. The first user is identified by a first identifier, and the second user is identified by a second identifier. To a second terminal, access at the vendor-managed web site is provided to: only a first portion of the purchasing information in response to receiving the first identifier from the second terminal which identifies the first user; and at least a second portion of the purchasing information in response to receiving the second identifier from the second terminal which identifies the second user. The second portion includes at least a part of the first portion and a third portion of the purchasing information. The part of the first portion includes at least a portion of the customized purchasing information.

109 Claims, 4 Drawing Sheets

U.S. PATENT DOCUMENTS

| | | | |
|---|---|---|---|
| 4,815,030 | A | 3/1989 | Cross et al. |
| 5,113,499 | A | 5/1992 | Ankney et al. |
| 5,230,048 | A | 7/1993 | Moy |
| 5,315,508 | A | 5/1994 | Bain et al. |
| 5,416,842 | A | 5/1995 | Aziz |
| 5,455,953 | A | 10/1995 | Russell |
| 5,553,239 | A | 9/1996 | Heath et al. |
| 5,598,536 | A | 1/1997 | Slaughter, III et al. |
| 5,606,668 | A | 2/1997 | Shwed |
| 5,608,900 | A | 3/1997 | Dockter et al. |
| 5,678,041 | A | 10/1997 | Baker et al. |
| 5,708,780 | A | 1/1998 | Levergood et al. |
| 5,710,887 | A | 1/1998 | Chelliah et al. |
| 5,712,979 | A | 1/1998 | Graber et al. |
| 5,721,908 | A | 2/1998 | Lagarde et al. |
| 5,751,956 | A | 5/1998 | Kirsch |
| 5,751,961 | A | 5/1998 | Smyk |
| 5,758,126 | A | 5/1998 | Daniels et al. |
| 5,761,683 | A | 6/1998 | Logan et al. |
| 5,802,299 | A | 9/1998 | Logan et al. |
| 5,812,769 | A | 9/1998 | Graber et al. |
| 5,812,776 | A | 9/1998 | Gifford |
| 5,819,285 | A | 10/1998 | Damico et al. |
| 5,822,518 | A | 10/1998 | Ooki et al. |
| 5,881,225 | A | 3/1999 | Worth |
| 5,903,732 | A | 5/1999 | Reed et al. |
| 5,970,472 | A | 10/1999 | Allsop et al. |
| 5,991,543 | A | 11/1999 | Amberg et al. |
| 5,995,757 | A | 11/1999 | Amberg et al. |
| 6,003,047 | A | 12/1999 | Osmond et al. |
| 6,014,666 | A | 1/2000 | Helland et al. |
| 6,026,433 | A | 2/2000 | D'Arlach et al. |
| 6,058,373 | A | 5/2000 | Blinn et al. |
| 6,061,057 | A | 5/2000 | Knowlton et al. |
| 6,064,977 | A | 5/2000 | Haverstock et al. |
| 6,073,124 | A | 6/2000 | Krishnan et al. |
| 6,076,166 | A * | 6/2000 | Moshfeghi et al. ............. 726/4 |
| 6,081,829 | A | 6/2000 | Sidana |
| 6,115,040 | A | 9/2000 | Bladow et al. |
| 6,125,352 | A | 9/2000 | Franklin et al. |
| 6,151,609 | A | 11/2000 | Truong |
| 6,192,407 | B1 | 2/2001 | Smith et al. |
| 6,393,462 | B1 | 5/2002 | Mullen-Schultz |
| 6,463,418 | B1 * | 10/2002 | Todd ........................... 705/26 |
| 6,632,248 | B1 * | 10/2003 | Isaac et al. .................. 715/273 |

FOREIGN PATENT DOCUMENTS

| | | |
|---|---|---|
| EP | 0 848 314 | 6/1998 |
| EP | 0 860 763 | 8/1998 |
| EP | 0 863 453 | 9/1998 |
| WO | 97/11429 | 3/1997 |
| WO | 97/13330 | 4/1997 |
| WO | 98/03923 | 1/1998 |

OTHER PUBLICATIONS

Baker, Brenda S.; Grosse, Eric, "Local Control Over Filtered WWW Access", pp. 1-9.

Kahan, Jose, "A Capability-Based Authorization Model for the World Wide Web", pp. 1-11.

Kasten, Eric, "Access Information Through World Wide Web: Installing Cern'S WWW Server", pp. 1-6.

Abowd, Gregory D.; Pitkow, James E. (College of Computing, Georgia Institute of Technology); Kazman, Rick (Department of Computer Science, University of Waterloo), Analyzing Differences Between Internet Information System Software Architectures, pp. 1-15.

Rao, Herman C.; Peterson, Larry L., "Accessing Files in an Internet: The Jade File System", Jun. 1993, pp. 613-624, vol. 19, No. 6, IEEE Transactions on Software Engineering.

Berners-Lee, Tim, "Uniform Resource Locators: Generated from the Hypertext", Mar. 1994, pp. 1-14.

Net.Genesis and Hall, Devra, "Build a Web Site: The Programmer's Guide to Creating, Building, and Maintaining a Web Presence", pp. 1-701, Prima Publishing, Rocklin, California.

Stempel, Steffen, "IpAccess-An Internet Service Access System for Firewall Installations", Apr. 1995, pp. 31-41, IEEE.

Tuohey, Sam, "Stanford Federal Credit Union Pioneers Online Financial Services", Jun. 21, 1995, Business Wire.

Portsmouth, Ian, "Strange New World", Oct. 1995, p. 34, Profit.

Sprout, Alison L.; Coxeter, Ruth M., "The Internet Inside Your Company: New Computer Networks Called Internal Webs Make It Easy For Employees At Companies Like Us West, Morgan Stanley, and Turner Broadcasting To Share Information And Collaborate On Projects. Best Of All. The Technology's Cheap And It's Safe", Nov. 27, 1995, p. 161, Information Technology Section, Fortune.

Papalia, Martha, "Ziff-Davis Interactive Announces First Free Personalized News Service On The World Wide Web; ZD Net Personal View Provides Customizable Snapshot of Computing News From Leading Information Sources", Oct. 10, 1995, Business Wire.

"PR Newswire Available on Ziff-Davis Interactive's 'ZD Net Personal View", Oct. 11, 1995, PR Newswire.

Sterne, Jim, "Customer Service on the Internet: Building Relationships Increasing Loyalty and Staying Competitive", 1996, pp. 1-317, John Wiley & Sons, Inc., USA.

Horton, William Taylor, Lee; Ignacio, Arthur; Hoft, Nancy L., "The Web Page Design Cookbook", 1996, pp. 1-649, John Wiley & Sons, Inc., USA.

Manning, Ric, "Manning the Wires: Small-Town Kentucky Bankers Beat the Big Guys to the Web", Jan. 1996, pp. 120-121, Boardwatch.

Tinoco, Lucio Cunha, Thesis: Online Evaluation in WWW-Based Courseware: The QUIZIT System, Jan. 20, 1996, pp. 1-81.

Manning, Ric, "Manning the Wires: Investment Firms Cash in on the Web", Feb. 1996, p. 120, Boardwatch.

Sandhu, Ravi S.; Coyne, Edward J.; Feinstein, Hal L., Youman, Charles E., "Role-Based Access Control Models", Feb. 1996, pp. 38-47, IEEE.

Creech, Michael, "Author-Oriented Link Management", Mar. 1996, pp. 1-16, Hewlett-Packard Company.

Press, Larry, "Windows NT as a Personal or Intranet Server", May 1996, vol. 39, No. 5, pp. 19-23, Communications of the ACM.

Lee, Chooi-Tian; Harris, J.W., "Designing a Virtual Access Control Configuration Protocol for Implementation Over ISDN and Shared-Media Networks", May 1996, pp. 116-125, IEEE.

Duan, Nick N., "Distributed Database Access in a Corporate Environment Using Java", May 1996, Fifth International World Wide Web Conference, Paris, France.

"FedEx Standardizes on Netscape Software for Internet and Intranet: Using Netscape Software for FedEx Intranet to Serve Corporate Needs", Jun. 11, 1996, Financial News.

"Enrollment Begins Today for ZD Net University on the Web, High-Tech Continuing Education Courses for Busy Professionals", Sep. 30, 1996, PR Newswire.

Tebbe, Mark, "Extranets Grow As Companies Link Intranets to Partners", Oct. 30, 1996, vol. 8, No. 22, Electronic Messaging News.

"Internet Solutions Promise Outsourcing Opportunities", Nov. 6, 1996, vol. 13, No. 23, Financial Services Report.

"Extranets Intelligently Link Intranets", Nov. 11, 1996, vol. 158, No. 45, PC Week, Ziff-Davis Publishing Company.

"ZD Net Launches ZD Net News, Breaks the Mold of News-Oriented Web Sites", Nov. 19, 1996, PR Newswire, Ziff-Davis Publishing Company.

"World Star Holdings, Ltd. To Provide Online Security for CoreStates Bank", Nov. 21, 1996, Financial News. PR Newswire.

Devoe, Deborah, "Case Study: Trailblazer-Heineken USA; Brewer HOPS Onto 'Net for Planning", Dec. 23, 1996, p. 15, Top of the News, InfoWorld.

Lange, Larry, "Engineering's Next Net Wave: Extranet", Dec. 23, 1996, Electronic Engineering Times.

Helmstetter, Greg, "Increasing Hits and Selling More on Your Web Site", 1997, pp. 1-374, John-Wiley & Sons, Inc., USA.

Dion, Denis, Jr., Escobar, Antoine, Tremblay, Jacques, Laurendeau, Denis, "Development of Educational Tools: A Web-Oriented Approach", 1997, Frontiers in Education Conference, pp. 842-847, IEEE.

Ferraiolo, David and Barkley, John; "Specifying and Managing Role-Based Access Control Within a Corporate Intranet", 1997, pp. 77-82, National Institute of Standards and Technology.

Prakash, S., "Extending The Corporate Intranet", 1997, pp. 21-26, IEEE.

Goldmann, Nahum, "Extranet: The Third Wave in the Internet Electronic Commerce", Jan. 1997, http://www.arraydev.com.

Perez, Juan Carlos, Heineken's HOPS Software Keeps A-Head on Inventory: Extranet Puts Sales Channel Data On Tap, Jan. 13, 1997, vol. 14, No. 2, PC Week, Ziff-Davis Publishing Company.

Frontier Software: WebCast Delivers Web Access To End-To-End Network Traffic Reports, Troubleshooting, Jan. 20, 1997, M2 Presswire.

Vacca, John R., "Intranet Security:Managing Intranet Security from Mobile and Remote Sites", 1997, Chapter 15, pp. 339-346, Charles River Media, Inc., Rockland Massachusetts.

Tari, Zahir and Chan, Shun-Wu, "A Role-Based Access Control For Intranet Security", Sep.-Oct. 1997, pp. 24-34, IEEE Internet Computing.

Elliott, Christopher, "Everything Wired Must Converge", Nov. 19, 1997, Journal of Business Strategy.

Memorandum Opinion And Order Construing Certain Claims Of United States Patents 6,182,275 and 6,038,597, Civil Action No. 4:03-CV-347, filed Nov. 2, 2006.

Expert Report of Susan Spielman Concerning US Patent No. 6038597 including Exhibits A-J, *Dell USA L.P.* vs. *Lucent Technologies, Inc.*, Civil Action No. 4:03CV-347, May 3, 2007.

Rebuttal Expert Report of Dr. Dean Noble, *Dell USA L.P.* vs. *Lucent Technologies, Inc.*, Civil Action No. 4:03CV347, Sep. 7, 2007.

SignPost . . . Directing Traffic To Your Site! Step 4 on the route to web success!; http://wwwsignpost.ca/step4html.

Robots Mailing List Archive: Re: Crawling & DNS Issues; http://www.robotstxt.org/wc/mailing-list/2026.html.

ANZCA—Web Links- Suggest a Link; http://www.anzca.edu.au/infocentres/weblinks/link.htm.

Big Bang Business Plan Competition, Calendar: http://bigbang.gsm.ucdavis.edu/.%5Cnews%5Cnews.html.

Linkage; Links +Linking; http://littlerowboat.net/piano/links/.

Interscan Corporation—Monitor Newsletter vol. 3, No. 1; http://www.gasdetection.com/NEWS/V3N1.html.

Ecommerce and Web Strategies; The Gadwall Group; http://www.gadwall.com/internet/ecommerceandweb.html.

Internal Rate of Return Revisited; http://members.tripod.com\~Ray Martin/DCF/nr7aa003.html.

OrderMate.com by Plateau; http://www.plateauzone.com/index.cfm?page=prod_omsec.

Rental Housing Professional Search; http://rhol.org.url/urlsearch2.asp.

Buddhist Philosophy on the Web; http://personal.wofford.edu/~kellerja/budweb.htm.

Redirecting Your Home Page; http:www.art.net/Help/redirecting.html.

Misnamed URL?; http:www.mhhe.com/physsci/physical/moore/messages/17.html.

Secure Computing; Protecting the World's Most Important Networks; http://www.securecomputing.com/index.cfm?sKey=275.

Interactive Advertising Bureau Jargon Buster Traffic; http://www.interactivejaronguide.org/Glossary/Term/Traffic.

Public Policy 195.26—Child Development for Public Policy: http://www.pubpol.duke.edu/centers/child/syl-lansford-F02.html.

Using the Internet—lumenweb; http://www.lumen.wa.edu.au/lumenweb2.html.

ArkySoftLLC—Mail Harvester Enterprise—Filters Tab; http://www.arkysoft.com/mh_ent_tutorials/mh_enterprise_filters_tab_asp.

Step aside please Google: evolt.org.News; http://www.evolt.org/article/Step_aside_please_Google/1/23289/?format=print.

Changing the URL of a site; http://www.webmasterworld.com/forum17/997.htm.

"The Consortium of the State of Tennessee", Request for Proposals 00-1 Bid #719; Dell Bid No. 299110190TS; Dec. 20, 1999.

Internet Access: Progress Software Delivers Powerful Solution for Building Internet Transaction Processing: Web-Speed Product Supported by Netscape, Sun Microsystems and Security Dynamics, EDGE: Work-Group Computing Report, vol. 7, Sep. 30, 1996, p. 12, and DIALOG Accession No. 01990880.

Original Complaint For Patent Infringement And Demand For Jury Trial, *Dell USA L.P.* vs. *Lucent Technologies, Inc.*, Civil Action No. 4:03cv347, filed Sep. 12, 2003.

Defendant Lucent Technologies, Inc.'s Answer and Counterclaims, *Dell USA L.P.* vs. *Lucent Technologies, Inc.*, Civil Action No. 4:03cv347, filed Oct. 29, 2003.

Plaintiff's Answer to Defendant's Counterclaim, *Dell USA L.P.* vs. *Lucent Technologies, Inc.*, Civil Action No. 4:03cv347.

* cited by examiner

| NAME | ADDRESS | PHONE | FAX | E-MAIL | TITLE | SUPPORT CATAGORY |
|---|---|---|---|---|---|---|
| MEMBER 1 | | | | | ACCOUNT EXECUTIVE | SALES |
| MEMBER 2 | | | | | CUSTOMER SERVICE EXECUTIVE | CUSTOMER SERVICE |
| MEMBER 3 | | | | | | |
| MEMBER 4 | | | | | | |
| MEMBER 5 | | | | | | |
| MEMBER 6 | | | | | | |
| MEMBER 7 | | | | | | |

Fig. 3

METHOD AND SYSTEM FOR RECEIVING AND PROVIDING ACCESS TO INFORMATION AT A WEB SITE

CROSS-REFERENCE TO RELATED APPLICATIONS

This application claims priority to and is a continuation of co-pending U.S. patent application Ser. No. 11/086,935 filed Mar. 22, 2005, which is a continuation of U.S. Pat. No. 6,883,022 issued on Apr. 19, 2005, which is a continuation of U.S. Pat. No. 6,694,365, issued on Feb. 17, 2004, which is a continuation of U.S. Pat. No. 6,038,597, issued on Mar. 14, 2000, all of which are incorporated herein by reference in their entirety.

BACKGROUND

The disclosures herein relate generally to information systems and more particularly to receiving and providing access to information at a web site.

Various systems have been developed whereby data and information can be accessed by a remote provider and a remote user. In one such system, a remote access server provides a remote user with access to a local computer network. The server receives a user identification string from its communication port, the string having been entered by the remote user at a remote computer which is coupled to the communication port. The string identifies the remote user. The server uses the string to access a database and determine an Internet protocol (IP) address associated with the string. The remote computer needs the IP address to communicate on the local computer network. The database includes a user identification string for each remote user and an IP address for each string. The remote access server sends the IP address to the remote computer via the communication port. The server then allows the remote computer to access the local computer network and to communicate on the local computer network using the IP address.

Another system is a multitask multiuser system which provides for efficient transfer of data from a remote data base to individual subscribers and has particular utility in the distribution of stock market data. A primary provider distributes the incoming data directly to user tasks or to an inquiry provider or a monitor provider. The inquiry provider responds to specific inquiries by users for information in the data base. The monitor provider maintains lists of information which are being monitored by the host computer for individual users. The inquiry provider and the monitor provider do not repeat requests to the remote data base where a similar request is already pending from another user. Data transfer paths between tasks are established by a code module which may be linked to any of the tasks. The transfer paths are established using information from a configuration list and they are monitored by the operating system through a wait list established for each user task. Providers in the system may establish subscriber lists through the code module.

In another application, an authorization mechanism provides authorization information for a client requesting access to a server resource in a server, having a directory server for storing client information required by the server in executing an operation call, including client access rights, and generating a request for an authorization ticket to the server. The request for an authorization ticket includes an identification of the client and an identification of the client information required by the server and is in association with an operation call. The authorization mechanism generates an authorization ticket including the identified information encrypted with an encryption key derived from the password of the server. The authorization ticket is sent to the server and the server decrypts the authorization ticket with the server password and obtains the client information directly including the client access rights. Client information is stored in directory server fields identified by generic field tags. The authorization ticket request identifies client information by tag names identifying the fields, the requested information is stored in the authorization ticket in fields identified by the tag names, and the server mechanism then reads the client information.

A further application includes a first data processing device (node I) coupled to a first private network and to a firewall server (FWA). Firewall server FWA is in turn coupled to a public network, such as the Internet. A second data processing device (node J) is coupled to a second private network which is coupled to the Internet through a firewall server (FWB). Node I provides a data packet including IP data and a destination address for the intended receiving node J to firewall FWA. Firewall FWA is provided with a secret value and a public value. The firewall FWA obtains a Diffie-Hellman (DH) certificate for firewall FWB and determines the public value from the DH certificate. A transient key is randomly generated and is used to encrypt the data packet to be transmitted by firewall FWA to firewall FWB. The encrypted data packet is then encapsulated in a transmission packet by the firewall FWA. The transmission packet includes an unencrypted destination address for the firewall FWB. Firewall FWA then sends the transmission packet to firewall FWB over the Internet. Upon receipt of the transmission packet from firewall FWA, firewall FWB obtains a DH certificate for firewall FWA and determines the public value from the DH certificate. Firewall FWB decrypts the encrypted data packet received from FWA, thereby resulting in the recovery of the original data sent by node I in unencrypted form to the firewall FWA. The firewall FWB then transmits the decrypted data packet to the receiving node J over the second private network.

Purchasing is a major component of the operation of a business. It involves establishing authorized vendor sources, seeking first time or unusual vendor sources and maintaining vendor relationships. Typically, as strong relationships build and as quantity buying develops, purchasing power can increase and purchasing costs can decrease. A major part of repetitive purchasing is based on purchasing history, i.e. what has been purchased in the past, what options are desired, and what options are available.

An important aspect of repetitive purchasing is the accessibility of purchasing history. A purchaser can maintain records as well as a vendor but this will most likely only reveal what has been purchased in the past. A customer may need to know about available options for anticipated purchases and a vendor may have modified or new products which are of interest to the customer. This can be accomplished by repeated direct contact between purchasing department personnel and vendor sales and accounting or other personnel. Such contact may be accomplished by numerous telephone calls to several sources at the vendor's site.

Information gathered by the purchaser from the vendor then needs to be communicated by purchasing personnel to the person(s) within the organization who requested the information. Additional phone calls and/or meetings may be required before a decision can be made for a definitive purchase. The purchasing agent must then negotiate the best price based on many factors including the nature of the item and the quantity desired.

Accordingly, a need has arisen for a method and system for receiving and providing access to information at a web site, in which various shortcomings of previous techniques are overcome.

SUMMARY

According to one embodiment, at a vendor-managed web site, purchasing information is received from a first terminal, including purchasing information that is customized for a customer. The customer includes first and second users having respective first and second levels of authorized access to the purchasing information. The first user is identified by a first identifier, and the second user is identified by a second identifier. To a second terminal, access at the vendor-managed web site is provided to: only a first portion of the purchasing information in response to receiving the first identifier from the second terminal which identifies the first user; and at least a second portion of the purchasing information in response to receiving the second identifier from the second terminal which identifies the second user. The second portion includes at least a part of the first portion and a third portion of the purchasing information. The part of the first portion includes at least a portion of the customized purchasing information.

A principal advantage of this embodiment is that various shortcomings of previous techniques are overcome.

BRIEF DESCRIPTION OF THE DRAWING

FIG. 3 is a diagrammatic view illustrating an embodiment of a team area of the web page.

DETAILED DESCRIPTION

Figure 1:
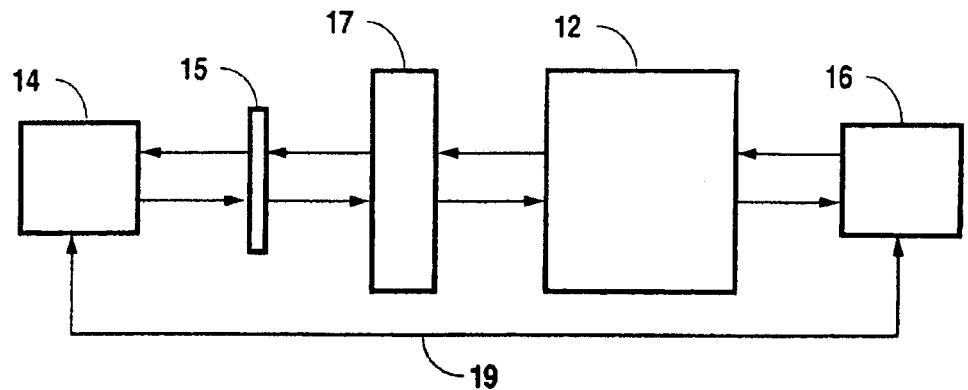
FIG. 1 is a diagrammatic view illustrating an embodiment of a network.

A network 10, FIG. 1 includes a web site 12 having a web page or several pages coupled to a first user point 14 and a second user point 16. The first user point 14 as used in this context is any terminal on a private network used by a site provider to input managed information to the web site 12. The second user point 16 as used in this context is any terminal used by a site user via the Internet to access all or part of the managed information at the web site 12.

The site provider at first user point 14, writes to a series of Internet tools, diagrammatically illustrated at 15, and publishes to an internal copy 17 of the web site 12 for pre-production purposes. Ultimately, the site provider publishes to the web site 12. The site user at second user point 16 has access to web site 12 and can also communicate directly via a link 19 with the site provider at first user point 14 via, for example, e-mail for the purpose of submitting orders for goods offered for sale at the web site 12. Additionally, the site provider directly accesses the web site 12 for maintenance purposes, e.g. to access the web site 12 to monitor traffic to the site and the quality of the site.

Figure 2:
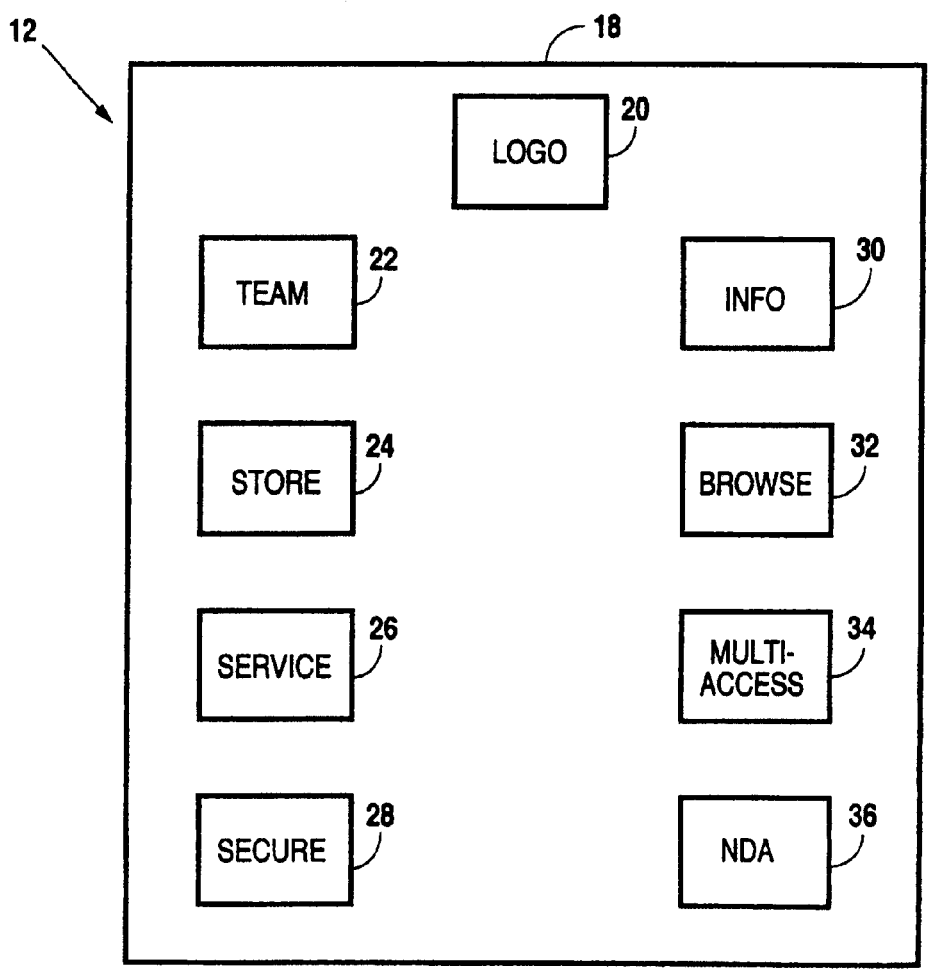
FIG. 2 is a diagrammatic view illustrating an embodiment of a web site.

Web site 12 includes a web page or pages 18, FIG. 2 including customized information to provide customers at second user point 16 with an easier way of doing business with a site provider at first user point 14. Web page 18 resides on the web site 12 behind an unlisted universal resource locator (URL). Users at second user point 16 are provided with user ID's and user passwords for accessing the web page 18.

Web page 18 features a user logo area 20 and a menu bar selection including a provider team area 22, a store area 24, a service and support area 26, a secure area 28, a site information area 30, a browse area 32, a multi-access area 34 and a non-disclosure agreement (NDA) area 36. The web page 18 information listed above in the various areas are maintained current by the site provider by multiple daily updates.

User logo area 20 includes, with the user's permission, a graphical representation of the logo of the user organization. If the user does not have a logo or does not wish for the logo to be used, the user organizations name may be used in text format.

Team area 22, FIG. 3 includes names, addresses, phone and fax numbers, e-mail links and titles of provider team members and a support category into which each team member is classified, e.g. sales, customer service, etc. Data listed in the team area can be changed with add-ons and updates in order to be maintained current. Other information can be provided if desired.

Figure 4:
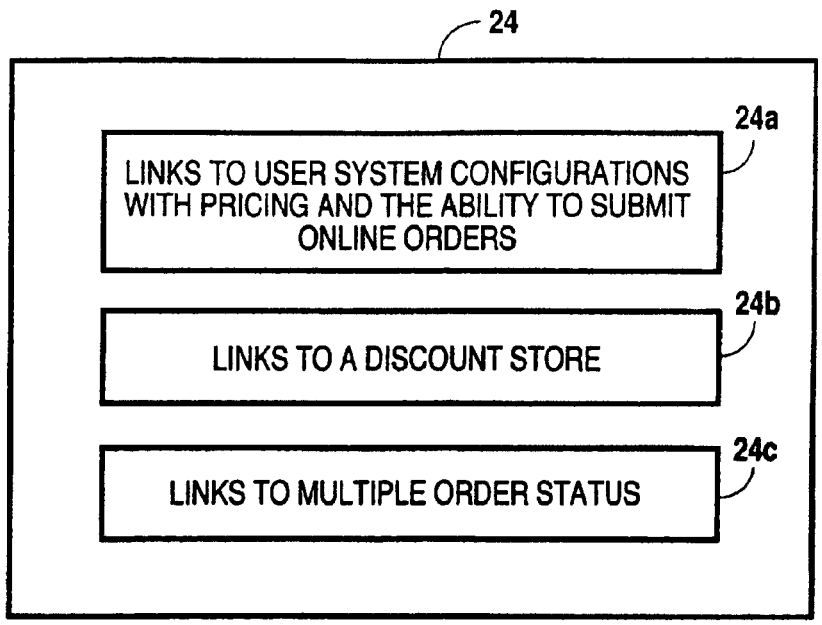
FIG. 4 is a diagrammatic view illustrating an embodiment of a store area of the web page.

Store area 24, FIG. 4 provides links to user standard system configurations 24a including pricing information and the ability to submit online orders; links to a discount store 24b for additional product information; and links to multiple order status 24c which permits the user to view status and shipping details of open orders. It is also possible to receive shipment e-mail notification automatically, if desired so that the user is prompted when an order is shipped. Store information may include a system category, title, a quote member, a price and a list of options. The store information may be modified by the site provider such as by adding a system category, changing a standard configuration, or changing other data included in the store information.

Figure 5:
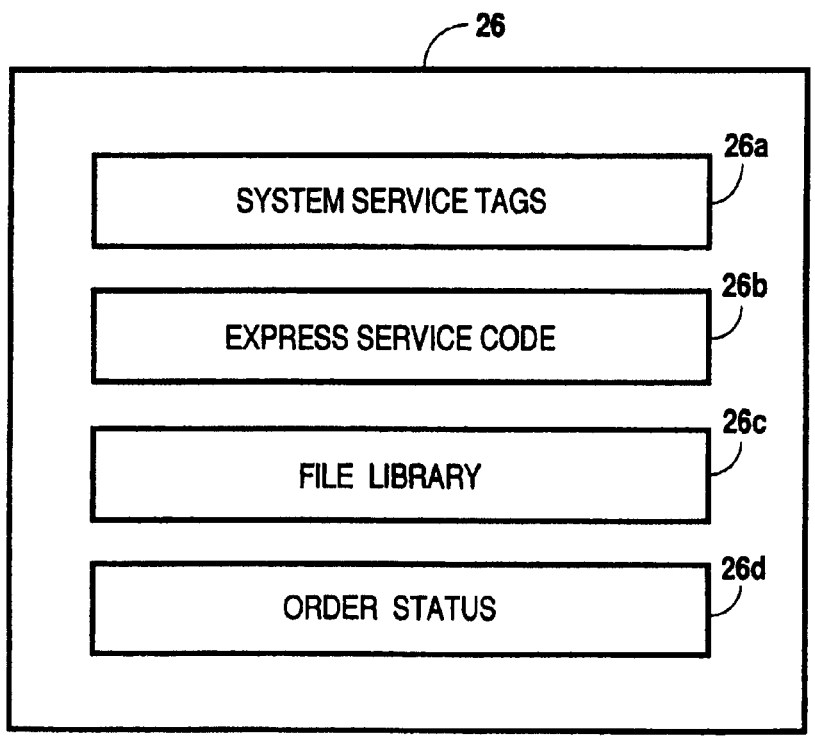
FIG. 5 is diagrammatic view illustrating an embodiment of a service area of the web page.

The service and support information area 26, FIG. 5 features system service tags (SST) 26a which utilizes a five (5) digit system identifier located on a sticker with a bar code on each product. The SST can be entered and information specific to the user's system will be provided. When the SST is entered, an express service code (ESC) 26b which is a unique numeric code, is generated for a user when the user enters the SST at the web site. This will avoid call transfers and menu options so that the user is routed directly to a specialist at the provider site who will provide help with the user system. A file library 26c functions as a repository of downloads, BIOS updates drivers and utilities for the user system. This allows the user to keep their system up-to-date at their convenience. These files may be grouped by system, file type, name and date posted. An order status function 26d provides current status of individual or multiple orders. Provider staff members can retrieve order, production and ship dates directly from an internal order management system in real time.

Figure 6:
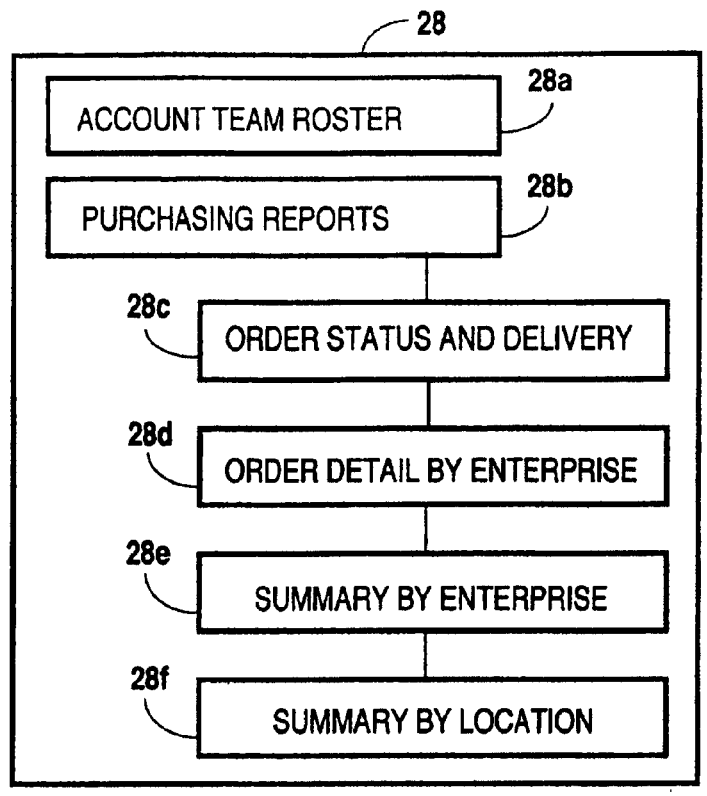
FIG. 6 is a diagrammatic view illustrating an embodiment of a secure area of the web page.

The secure area 28, FIG. 6 includes an account team roster 28a and purchasing reports 28b. The account team roster includes pager links and allows direct user contact with account team provider members. There are four (4) different purchasing reports which are provided and regularly updated. Each report is viewable online or available for download in several formats. An order status and delivery report 28c shows the user detailed information on all orders from pending production status to invoiced status. An order detail by enterprise 28*d* report shows the detailed information on the units shipped and amount spent by product category for orders invoiced during a month. A summary by enterprise report 28*e* shows total units and spending by product category for the order invoiced during a month. Finally, a summary by location report 28*f* shows total units and spending by product category for each location in the user organization and includes only orders invoiced during a month.

The information area 30 includes links to the web site home and tips on how to use the web site as well as a feedback form to permit the user to submit ideas to the provider concerning how to improve the web site.

The browse area 32 provides easy access to the provider home page as well as to select links on the web site which may be of interest to the user.

Figure 7:
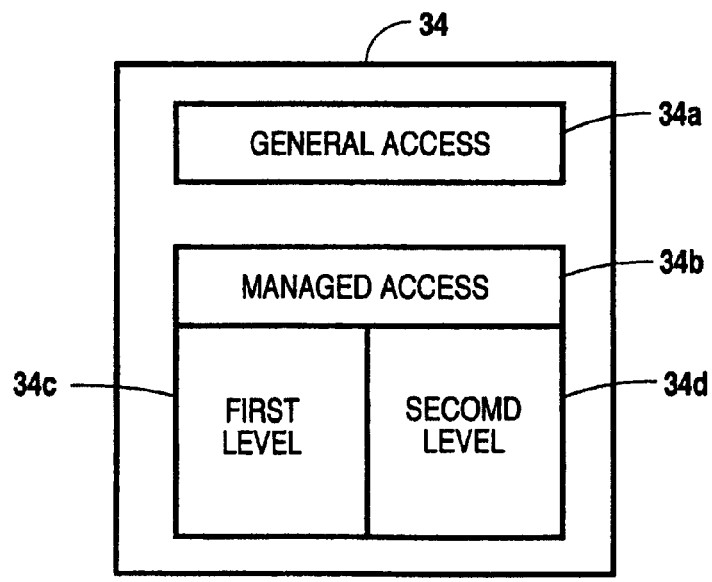
FIG. 7 is a diagrammatic view illustrating an embodiment of a multi-access area of the web page.

The multi-access area 34, FIG. 7 has at least two (2) levels of access, each of which is associated with the user ID and password mentioned above. One access area is referred to as a general access user ID and password area 34*a* and allows users to see everything at the web site except for the secure area 28. The other access area is referred to as a managed access user ID and password area 34*b* and allows users to see everything at the site including the secure area 28. The managed area may, if desired, be subdivided into multi-level access areas so that a first level managed access user ID and password allows users to see everything at the web site including a first portion 34*c* of the secure area 28 and a second level managed access user ID and password allows users to see everything at the web site including the first and a second portion 34*c*, 34*d*, respectively, of the secure area 28. Provider team members contact appropriate personnel at the user organization and provide the URL and multi-level ID's and passwords as required for user access to the web site 12. An intranet manager at the user organization can add a link from the second user point 16 to the web site 12 and post the general user ID and password next to the link for web site 12. This will permit anyone at the second user point 16 to access the web site 12 instead of having to recall a URL, user ID and password. The user organization will be responsible for designating appropriate people at the user organization to have the managed user ID and password usually reserved for a select group of users which may be defined by job description, rank, title, etc.

The online NDA 36 is provided each time a user visits web site 12 for the first time. After entering the URL for the organization web page 18, the user will be prompted to view and accept the online NDA 36. Once the NDA 36 is accepted, the user's hard drive at the terminal being used will function so as not to prompt that particular user with the NDA 36 again. However, each time a user accesses the organization web page 18 from a different terminal at second user point 16 for the first time, the user will be prompted to accept the NDA 36, and upon accepting, the terminal being used will function so as not to prompt that particular user with the NDA 36 again.

As it can be seen, the principal advantages of this embodiment are that the web site provides information which is continuously updated by the provider and makes business purchases easier to initiate, manage and control for both the organization user/buyer and the provider/seller and reduces purchasing and maintenance costs for both user and provider. In addition, direct relationships between user and provider are enhanced and supported from pre-sales to post-sales. The provider is able to off-load tasks such as order quoting and order status from the sales staff so that they can spend more time selling product. The user is encouraged to do more transactions and information gathering online which is more efficient. A competitive advantage to the provider is that the user can conduct business with the provider in an easier, more cost efficient manner. User satisfaction and loyalty is enhanced and new users are attracted to this mode of purchasing from the provider.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An Internet information device comprising;
   a web site;
   a first user intranet point coupled for periodically providing multi-level managed information to the web site;
   said web site having customized managed information for a user organization having a plurality of users;
   a second user Internet point coupled for designating multi-level user access to the managed information amongst the plurality of users such that a first selected user ID and user password provides user access to a first set of the customized managed information, and a second selected user ID and user password provides user access to a second set of the customized managed information, which second set is more limited than said first set; and
   said first set and second set of customized managed information being displayed at respective web pages accessible at Internet addresses, not purposefully made available for discovery, by the plurality of users at said second user Internet point provided with at least one of said first selected user ID and user password and said second selected user ID and user password.

2. An Internet information method comprising:
   providing a web site including customized managed information for a user organization having a plurality of users;
   periodically providing multi-level managed information to the web site from a first user intranet point; and
   coupling second user Internet points for designating multi-level user access to the managed information amongst the plurality of users such that a first selected user ID and user password provides user access to a first set of the customized managed information, and a second selected user ID and user password provides user access to a second set of the customized managed information, which second set is more limited than the first set, wherein said first set and second set of customized managed information are displayed at respective web pages accessible at Internet addresses, not purposefully made available for discovery, by the plurality of users at said second user Internet points provided at least one of said first selected user ID and user password and said second selected user ID and user password.

3. An Internet information system comprising:
   a vendor intranet point including an information handling system (IHS) coupled for periodically providing multi-level managed information to a web site;
   said web site including customized managed information for a user organization having a plurality of users;
   buyer Internet points, each including an IHS, coupled for designating multi-level user access to the managed information amongst the plurality of users such that a first selected user ID an user password provides user access to a first set of the customized managed information, and a second selected user ID and user password provides user access to a second set of the customized managed information, which second set is more limited than said first set; and said first set and second set of customized managed information being displayed at respective web pages accessible at Internet addresses, not purposefully made available for discovery, by the plurality of users at said buyer Internet points provided with at least one of said first selected user ID and user password and said second selected user ID and user password.

4. An Internet information method comprising:

providing a web site;

coupling a first user intranet point for periodically providing multi-level managed information to the web site;

including, at said web site, customized managed information for a user organization having a plurality of users;

coupling a second user Internet point for designating multi-level user access to the managed information amongst the plurality of users such that a first selected user ID and user password provides user access to a first set of the customized managed information, and a second selected user ID and user password provides user access to a second set of the customized managed information, which second set is more limited than said first set; and displaying said first set and second set of customized managed information at respective web pages accessible at Internet addresses, not purposefully made available for discovery, by the plurality of users at said second user Internet point provided with at least one of said first selected user ID and user password and said second selected user ID and user password.

5. An Internet information method comprising:

including, at a vendor intranet point, an information handling system (IHS) coupled for periodically providing multi-level managed information to a web site;

including, at said web site, customized managed information for a user organization having a plurality of users;

coupling buyer Internet points, each including an IHS, for designating multi-level user access to the managed information amongst the plurality of users such that a first selected user ID an user password provides user access to a first set of the customized managed information, and a second selected user ID and user password provides user access to a second set of the customized managed information, which second set is more limited than said first set; and displaying said first set and second set of customized managed information at respective web pages accessible at Internet addresses, not purposefully made available for discovery, by the plurality of users at said buyer Internet points provided with at least one of said first selected user ID and user password and said second selected user ID and user password.

6. An information access system, comprising:

a first user intranet point coupled to a website, the first user intranet point for providing multi-level managed information to the website, wherein the multi-level managed information comprises customized information for a user organization having a plurality of users; and a second user Internet point coupled to the website, the second user Internet point for designating multi-level access amongst the plurality of users to the customized information, wherein first access information provides access to a first set of the customized information, and second access information provides access to a second set of the customized information that is limited relative to the first set of the customized information;

wherein the first set of the customized information is made available, through at least one web page at the web site, to the plurality of users providing the first access information through the second user Internet point;

wherein the second set of the customized information is made available, through at least one web page at the web site, to the plurality of users providing the second access information through the second user Internet point; and wherein the web pages are associated with Internet addresses that are not purposefully made available for discovery through a web search or otherwise.

7. The system of claim 6, wherein the first access information comprises a first site user identification and a first site user password.

8. The system of claim 6, wherein the second access information comprises a second site user identification and a second site user password.

9. The system of claim 6, wherein the first user intranet point periodically provides the multi-level managed information to the website.

10. The system of claim 6, wherein the first user intranet point brings up to date the multi-level managed information as new multi-level managed information becomes available.

11. The system of claim 6, wherein the site users comprise part of an organization, and the website comprises a indicator of the organization.

12. The system of claim 6, wherein the website comprises contact information for the site users.

13. The system of claim 6, wherein the website comprises pricing information.

14. The system of claim 6, wherein the website comprises order status information.

15. The system of claim 6, wherein the website comprises store information.

16. The system of claim 6, wherein the website is operable to receive a system identifier from the second user Internet point.

17. The system of claim 16, wherein the website generates a service code in response to receiving the system identifier.

18. The system of claim 6, wherein the website comprises a file library.

19. The system of claim 6, wherein the website comprises a purchasing report.

20. The system of claim 19, wherein the purchasing report comprises an order status and delivery report.

21. The system of claim 19, wherein the purchasing report comprises an order detail by enterprise report.

22. The system of claim 19, wherein the purchasing report comprises a summary by enterprise report.

23. The system of claim 19, wherein the purchasing report comprises summary by location report.

24. The system of claim 6, wherein the second set of customized information comprises the first set of customized information and additional customized information not included with the first set of customized information.

25. The system of claim 6, wherein the website comprises a nondisclosure agreement.

26. The system of claim 25, wherein the nondisclosure agreement is presented to a site user terminal that comprises the second user Internet point in response to detecting an initial access of the website through the site user terminal.

27. The system of claim 6, wherein the second user Internet point is operable to submit purchasing information through the website.

28. The system of claim 27, wherein the first user intranet point is operable to receive the purchasing information and incorporate the purchasing information into the multi-level managed information.

29. The system of claim 27, wherein the first user intranet point is operable to receive the purchasing information and incorporate the purchasing information into the customized information.

30. A method for providing information access, comprising:
providing, from a first user intranet point, multi-level managed information to a website that that is operable to include at least one web page associated with an Internet address that is not purposely made available for discovery through a web search or otherwise, the multi-level managed information comprising customized information for a user organization having a plurality of users;
designating, from a second user Internet point, access for at least one of the plurality of users to a first set of the customized information on the at least one web page in response to receiving first access information; and
designating, from the second user Internet point, access for at least one of the plurality of users to a second set of the customized information on the at least one web page in response to receiving second access information, wherein the second set of the customized information is limited relative to the first set of the customized information.

31. The method of claim 30, wherein the providing multi-level managed information comprises periodically updating the multi-level managed information on the website.

32. The method of claim 30, wherein the providing multi-level managed information comprises updating the multi-level managed information as new multi-level managed information becomes available.

33. The method of claim 30, wherein the receiving first access information comprises receiving a first site user identification and a first site user password.

34. The method of claim 30, wherein the receiving second access information comprises receiving a second site user identification and a second site user password.

35. The method of claim 30, further comprising:
providing contact information for at least one of the plurality of site users on the website.

36. The method of claim 30, further comprising:
providing pricing information on the website.

37. The method of claim 30, further comprising:
providing order status information on the website.

38. The method of claim 30, further comprising:
providing store information on the website.

39. The method of claim 30, further comprising:
receiving at least one system identifier through the website.

40. The method of claim 39, further comprising:
generating at least one service code in response to receiving the at least one system identifier.

41. The method of claim 30, further comprising:
providing access to a file library through the website.

42. The method of claim 30, further comprising:
providing a purchasing report on the website.

43. The method of claim 42, wherein the purchasing report comprises an order status and delivery report.

44. The method of claim 42, wherein the purchasing report comprises an order detail by enterprise report.

45. The method of claim 42, wherein the purchasing report comprises a summary by enterprise report.

46. The method of claim 42, wherein the purchasing report comprises a summary by location report.

47. The method of claim 30, wherein the second set of customized information comprises the first set of customized information and additional customized information not included with the first set of customized information.

48. The method of claim 30, wherein the Internet addresses comprise unlisted universal resource locators.

49. The method of claim 30, further comprising:
providing a non-disclosure agreement to at least one of the site users through the website.

50. The method of claim 30, further comprising:
presenting a nondisclosure agreement through the website in response to detecting an initial access of the website through a site user terminal.

51. The method of claim 30, further comprising:
receiving purchasing information.

52. The method of claim 51, further comprising:
incorporating the purchasing information into the multi-level managed information.

53. The method of claim 51, further comprising:
incorporating the purchasing information into the customized information.

54. A multi-level access website, comprising:
at least one site provider terminal that is coupled to at least one server through an intranet connection and that provides multi-level managed information to a website on the at least one server, wherein the multi-level managed information comprises customized information for a user organization having a plurality of users that is available at a secure area at the website; and
a managed access area at the website, the managed access area for providing multi-level access to the secure area, wherein at least one user terminal is coupled to the at least one server for designating multi-level user access amongst the plurality of users to the managed access area such that first access information provides access to a first set of the customized information, and second access information provides access to a second set of the customized information that is limited relative to the first set of the customized information;
wherein the first set of the customized information is made available, through at least one web page at the website, in response to the at least one server receiving the first access information through an Internet connection;
wherein the second set of the customized information is made available, through at least one web page at the website, in response to the at least one server receiving the second access information through an Internet connection; and
wherein the web pages are associated with Internet addresses that are not purposefully made available for discovery through a web search or otherwise.

55. The website of claim 54, wherein the first access information comprises a first identification and a first password.

56. The website of claim 54, wherein the second access information comprises a second identification and a second password.

57. The website of claim 54, wherein the at least one site provider terminal periodically provides the multi-level managed information to the website.

58. The website of claim 54, wherein the at least one site provider terminal brings up to date the multi-level managed information as new multi-level managed information becomes available.

59. The website of claim 54, wherein the website comprises contact information for users of the customized information.

60. The website of claim 54, wherein the website comprises pricing information.

61. The website of claim 54, wherein the website comprises order status information.

62. The website of claim 54, wherein the website comprises store information.

63. The website of claim 54, wherein the website is operable to receive a system identifier.

64. The website of claim 63, wherein the website generates a service code in response to receiving the system identifier.

65. The website of claim 54, wherein the website comprises a file library.

66. The website of claim 54, wherein the website comprises a purchasing report.

67. The website of claim 54, wherein the second set of customized information comprises the first set of customized information and additional customized information not included with the first set of customized information.

68. The website of claim 54, wherein the website comprises a nondisclosure agreement.

69. The website of claim 54, wherein the at least one site provider terminal is operable to receive purchasing information through the Internet connection.

70. The website of claim 69, wherein the at least one site provider terminal is operable to incorporate the purchasing information into the multi-level managed information.

71. The website of claim 69, wherein the at least one site provider terminal is operable to incorporate the purchasing information into the customized information.

72. A method for providing a multi-level access website, comprising:
receiving, from a first user point through an intranet connection, multi-level managed information at a website that that is operable to include at least one web page associated with an Internet address that is not purposely made available for discovery through a web search or otherwise, the multi-level managed information comprising customized information for a user organization having a plurality of users, wherein multi-level user access to the multi-level managed information is designated amongst the plurality of users at a second user point;
receiving, from the second user point through an Internet connection, first access information and, in response to receiving the first access information, making available, through the Internet connection, a first set of the customized information on the at least one web page; and
receiving, from the second user point through an Internet connection, second access information and, in response to receiving the second access information, making available, through the Internet connection, a second set of the customized information on the at least one web page, wherein the second set of the customized information is limited relative to the first set of the customized information.

73. The method of claim 72, wherein the receiving multi-level managed information comprises periodically receiving the multi-level managed information on the website.

74. The method of claim 72, wherein the receiving multi-level managed information comprises receiving the multi-level managed information as new multi-level managed information becomes available.

75. The method of claim 72, wherein the receiving first access information comprises receiving a first site user identification and a first site user password.

76. The method of claim 72, wherein the receiving second access information comprises receiving a second site user identification and a second site user password.

77. The method of claim 72, further comprising:
receiving, through the Internet connection, at least one system identifier.

78. The method of claim 77, further comprising:
generating at least one service code in response to receiving the at least one system identifier.

79. The method of claim 72, wherein the second set of customized information comprises the first set of customized information and additional customized information not included with the first set of customized information.

80. The method of claim 72, further comprising:
displaying a nondisclosure agreement on the website in response to detecting an initial access of the website by a site user terminal.

81. The method of claim 72, further comprising:
receiving, through an Internet connection, purchasing information.

82. The method of claim 81, further comprising:
displaying the purchasing information as part of the first set of customized information.

83. The method of claim 81, further comprising:
displaying the purchasing information as part of the second set of customized information.

84. A method for obtaining access to a multi-level access website, comprising:
receiving, at a first user Internet point, first access information and second access information;
designating, at the first user Internet point, at least one site user for using the first access information and at least one site user for using the second access information;
accessing, from the first user Internet point, at least one web page associated with Internet addresses that are not purposely made available for discovery through a web search or otherwise, the at least one web page comprising customized information for user organization that includes the site users and that is provided from a second user intranet point;
obtaining a first set of the customized information, by the at least one site user on the at least one web page, in response to providing the first access information; and
obtaining a second set of the customized information, by the at least one site user on the at least one web page, in response to providing the second access information, wherein the second set of the customized information is limited relative to the first set of the customized information.

85. The method of claim 84, wherein the customized information is periodically updated.

86. The method of claim 84, wherein the customized information is updated as new customized information becomes available.

87. The method of claim 84, wherein the first access information comprises a first identification and a first password.

88. The method of claim 84, wherein the second access information comprises a second identification and a second password.

89. The method of claim 84, further comprising:
providing at least one system identifier to at least one of the web pages.

90. The method of claim 89, further comprising:
receiving at least one service code in response to providing the at least one system identifier.

91. The method of claim 84, wherein the second set of customized information comprises the first set of customized information and additional customized information not included with the first set of customized information.

92. The method of claim 84, further comprising:

obtaining a nondisclosure agreement in response to initially accessing at least one of the web pages using a site user terminal.

93. The method of claim 84, further comprising:

providing purchasing information.

94. The method of claim 93, wherein the first set of customized information comprises the purchasing information.

95. The method of claim 93, wherein the second set of customized information comprises the purchasing information.

96. A method for managing customized information, comprising:

accessing, from a first user point through the Internet, at least one web page associated with an Internet address that is not purposely made available for discovery through a web search or otherwise, the at least one web page comprising customized information that is provided from a second user point and that includes purchase orders for a user organization that includes a plurality of users;

designating, from the first user point, multi-level access to the customized information by providing a first of the plurality of users first access information and providing a second of the plurality of users second access information;

providing, from the first user point, the first access information to access, through the Internet, a first set of the customized information on the at least one web page;

providing, from the first user point, the second access information to access, through the Internet, a second set of the customized information on the at least one web page, wherein the second set of the customized information is limited relative to the first set of the customized information; and placing, from the first user point through the Internet, at least one purchase order after accessing the at least one web page.

97. The method of claim 96, wherein the customized information is periodically updated.

98. The method of claim 96, wherein the customized information is updated as new customized information becomes available.

99. The method of claim 96, wherein the first access information comprises a first identification and a first password.

100. The method of claim 96, wherein the second access information comprises a second identification and a second password.

101. The method of claim 96, further comprising:

providing at least one system identifier to at least one of the web pages.

102. The method of claim 101, further comprising:

receiving at least one service code in response to providing the at least one system identifier.

103. The method of claim 96, further comprising:

wherein the customized information related to the at least one purchase order comprises a purchasing report.

104. The method of claim 103, wherein the purchasing report comprises an order status and delivery report.

105. The method of claim 103, wherein the purchasing report comprises an order detail by enterprise report.

106. The method of claim 103, wherein the purchasing report comprises a summary by enterprise report.

107. The method of claim 103, wherein the purchasing report comprises a summary by location report.

108. The method of claim 96, wherein the second set of customized information comprises the first set of customized information and additional customized information not included with the first set of customized information.

109. The method of claim 96, further comprising:

obtaining a nondisclosure agreement through the web pages in response to initially accessing at least one of the web pages using a site user terminal.

* * * * *

UNITED STATES PATENT AND TRADEMARK OFFICE
CERTIFICATE OF CORRECTION

| | | |
|---|---|---|
| PATENT NO. | : 7,779,125 B2 | Page 1 of 1 |
| APPLICATION NO. | : 12/110769 | |
| DATED | : August 17, 2010 | |
| INVENTOR(S) | : Amy Van Wyngarden | |

It is certified that error appears in the above-identified patent and that said Letters Patent is hereby corrected as shown below:

Claim 30, Column 9, line 12 delete "that that" and insert --that--

Claim 72, Column 11, line 35 delete "that that" and insert --that--

Signed and Sealed this

Thirteenth Day of September, 2011

David J. Kappos
*Director of the United States Patent and Trademark Office*